Figure 1:
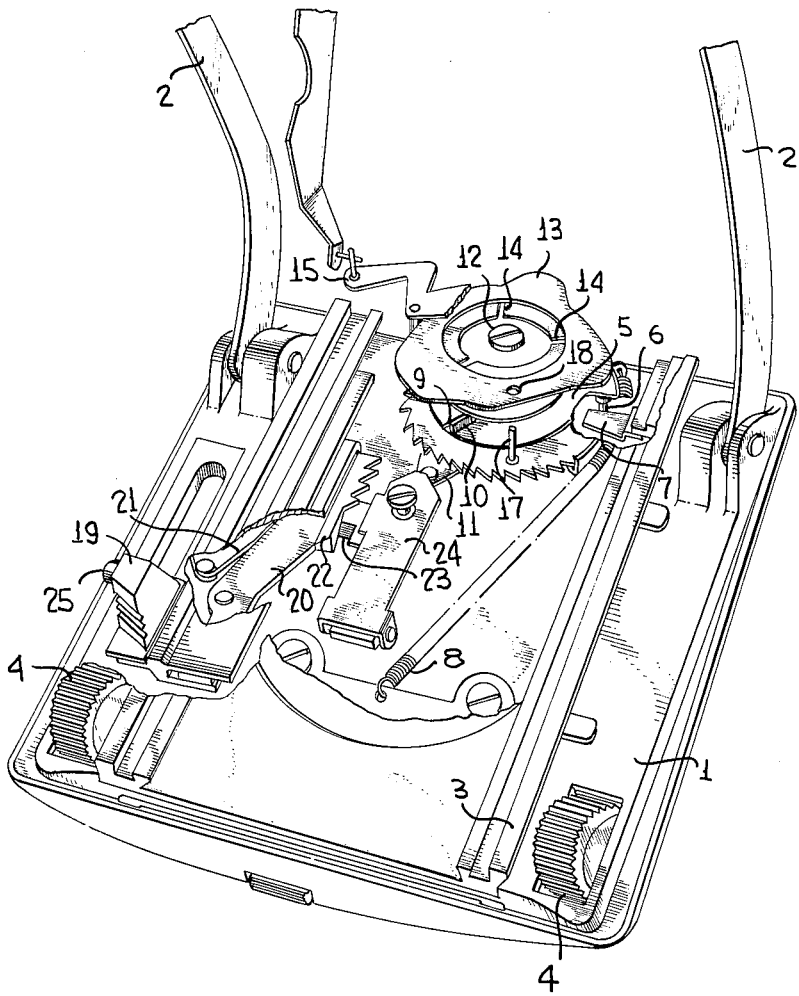

Aug. 3, 1965  N. KARPF  3,198,098
CAMERA RANGE-FINDER ADJUSTMENT SYSTEM
Filed July 23, 1962  2 Sheets-Sheet 1

INVENTOR
Nikolaus Karpf
BY Stevens, Davis, Miller & Mosher
ATTORNEYS

Aug. 3, 1965 N. KARPF 3,198,098
CAMERA RANGE-FINDER ADJUSTMENT SYSTEM
Filed July 23, 1962 2 Sheets-Sheet 2

INVENTOR
Nikolaus Karpf
BY Stevens, Davis, Miller & Mosher
ATTORNEYS

United States Patent Office 3,198,098
Patented Aug. 3, 1965

3,198,098
CAMERA RANGE-FINDER ADJUSTMENT SYSTEM
Nikolaus Karpf, 45 Rupert-Mayer Strasse, Munich 25, Germany
Filed July 23, 1962, Ser. No. 211,775
Claims priority, application Austria, July 22, 1961, A 5,653/61
11 Claims. (Cl. 95—44)

The invention relates to a range-finder adjustment system for cameras with interchangeable lenses, and particularly for cameras with extensible baseboards, wherein a cam, having a plurality of cam lobes associated with the various lenses and each extending through a given angular range thereof, is mounted on a cam support, which is turned when the range is adjusted, so that a cam follower member, whose movement is transferred to a movable member of the range-finder, contacts the cam lobe associated with the lens used when the range is adjusted.

Such a transference system is known and has proved successful. Only the exchange of cam lobes, which has to be carried out each time the lens is changed, is laborious and time-consuming with the known construction. In the known transference system the cam is connected to the cam support by a screw. In order to change the cam lobes, the screw has to be released and the cam then turned in relation to the cam support into a position corresponding to the lens inserted, by direct action on the cam. The cam and cam support are reconnected by tightening the screw. As the cam and cam support are mounted on the baseboard, the lens carrier must first be pushed back into the casing in order to make the cam accessible. This further complicates the changing of cam lobes.

The present invention eliminates the above disadvantages, in that the cam is rotatable in relation to the cam support and can be fixed by friction or locking, and in that a special actuating member is provided in an easily accessible place to enable the cam to be turned in relation to the cam support. In a particularly desirable construction of the invention, the actuating member can be mounted for longitudinal displacement at one side of the camera baseboard. According to a modification of the invention, the cam can be provided with grooves or incisions arranged at an angular distance from each other, for engagement by a locking member. The locking member may be mounted on a resilient tongue, which is acted on by a release or by the actuating member so that the locking member is withdrawn from the groove or incision. The cam is preferably mounted concentrically with the cam support for rotation about a common spindle and secured by a radially spaced securing pin which engages in a securing hole. Further according to the invention, the laterally longitudinally displaceable actuating member mounted on the baseboard may carry a toothed rack engaging a ratchet wheel mounted concentrically with the cam and cam support. When the toothed rack is longitudinally displaced it can press a resiliently mounted lever against the baseboard through an oblique surface, which lever in turn actuates the tongue carrying the locking member. According to a further special feature, the longitudinally displaceable actuating member may be secured against unintentional actuation.

Figure 2:
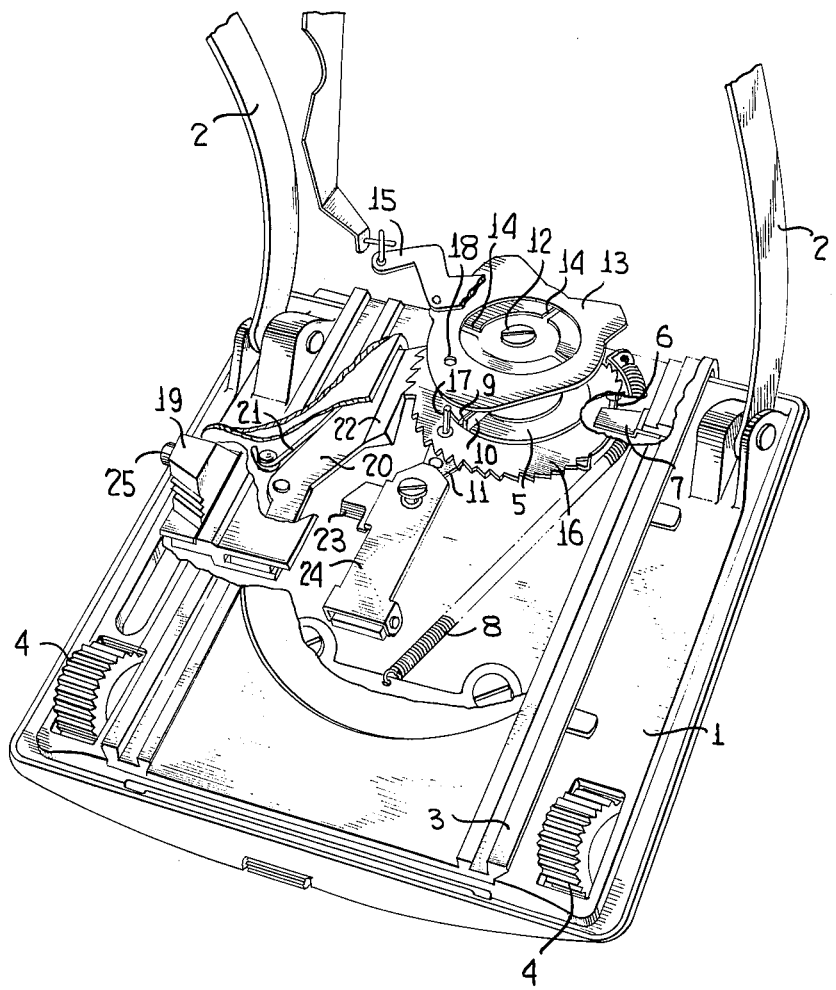

Details of the invention and its advantages are given in the following description of an example illustrated in the accompanying drawings. This is shown in two different functioning positions, and all unnecessary parts of the camera have been omitted. For the sake of clarity the cam is shown raised above the cam support. FIG. 1 shows the working position of the range-finder transference system and FIG. 2 a position assumed while the cam is being changed.

1 denotes the drop bed of a photographic camera, which is held in the opened position by struts 2. The actual camera housing or casing, which is connected to the drop bed 1 by a hinge joint, is not illustrated. A slide 3 having a dovetail-shaped guide is in known manner mounted on the inside of the drop bed 1 for displacement relatively thereto. The lens carrier (not shown) can be displaced or fixed on the slide 3. Sharp focussing is effected in known manner by moving the slide 3 relatively to the baseboard by means of a toothed drive (not shown) which is actuated through rotary knobs 4.

Below the slide 3, near the hinge joint (not shown) connecting the baseboard to the camera casing, a disc-shaped cam support 5 is mounted for rotation on the drop bed 1. Its underside carries a bolt 6. The underside of the slide 3 is provided with a lug 7 in the region of the bolt 6. A tension spring 8, fixed at one end to the drop bed 1 and at the other end to the cam support 5, keeps the bolt 6 constantly abutting the lug 7, so that the cam support 5 is turned at every movement of the slide 3.

The cam support 5 has a recess 9 at one side. Projecting upwardly through it is a locking member 10, which is fixed to a resilient tongue 11 mounted below the cam support 5. A cam 13 is coaxially connected to the cam support 5 by an axially arranged screw 12 in such a way that it is rotatable relatively to the support 5. The edge of the cam 13 is shaped so as to form cam lobes extending over different angular ranges for different focal lengths of the lenses. If, in an exceptional case, more lenses are used than the number of cam lobes that can be accommodated on one cam, then the cam can easily be exchanged by releasing the screw 12. At the same radial spacing as that of the locking member 10, the cam 13 has recesses 14 corresponding to the number and angular distance of the cam lobes. The locking member 10 can drop into these recesses to establish a firm connection between the cam support 5 and the cam 13. A cam follower member 15 is applied under spring pressure to whichever cam lobe is in the working position. Its position is transmitted to the movable member of the range-finder to adjust the latter in a manner which is known and is therefore not illustrated.

A ratchet wheel 16 is arranged concentrically with the cam support 5. Its upper side carries a securing pin 17 which engages in a matching securing hole 18 in the cam 13 to form connection means between the parts 13 and 16.

A slide 19 is provided on the upper side of the drop bed 1 near one side edge. A toothed rack 20 is pivotally fixed to it at the height of the ratchet wheel 16 and substantially tangentially thereto. The rack is acted on by a spring 21. The serrations on the ratchet wheel 16 and the toothed rack 20 are saw-toothed. The underside of the toothed rack has an oblique surface 22. Extending under the toothed rack 20 is a projection 23 with an opposite inclination, from a lever 24 which is urged upwardly by a spring (not shown). The free end of the lever 24 lies over the end of the resilient tongue 11 when the slide 3 is in its backward abutment position. In its initial position the slide 19 is secured against unintentional actuation by a manually releasable locking means (not shown). A push-button 25 serves to release this lock.

The apparatus described operates as follows: In the functioning position shown in FIG. 1 the slide 19 is in its front initial position, where it is secured by a lock. The toothed rack 20 is not in engagement with the ratchet wheel 16. When the slide 3 is moved for sharp focussing, therefore, the cam support 5 is turned, as mentioned above, through the lug 7 and the bolt 6 applied thereto. By means of the locking member 10, the cam 13 participates in every rotation of the cam support 5. The rotation of the cam 13 is followed by the cam follower member 15, which acts on the range finder. Owing to the securing pin 17, the ratchet wheel 16 is also turned by the cam 13. In the working position shown in FIG. 1, however, the wheel has no function. If the cam lobe has to be changed in accordance with the changing of the lens, the slide lock is released by operating the pushbutton 25 and the slide 19 pushed towards the hinge of the drop bed. Before the toothed rack 20 engages in the ratchet wheel 16, the oblique surface 22 on the underside of the slide abuts the inclination 23 and presses the lever 24 downwardly against the action of its associated spring. The lever presses onto the tongue 11 and draws the locking member 10 out of the incision 14 in the cam 13 in which it previously engaged. The cam 13 is now rotatable in relation to the cam support 5. When the toothed rack 20 abuts and turns the ratchet wheel 16, as the slide 19 is moved on, the cam 13 is turned simultaneously since the wheel 16 and cam 13 are connected by the securing pin 17. On further movement the toothed rack 20 releases the lever 24, so that the locking member 10 can drop into the next recess 14. Thus the cam 13 is once more locked in relation to the cam support 5.

The ratchet wheel 16 is prevented from turning backwards by friction or by a special blocking member. When the slide 19 is moved back the toothed rack 20 swings against the action of the spring 21 so that it slides along the ratchet wheel 16. When it impinges on the lever projection 23, the toothed rack 20 is also displaced, so that it avoids the projection and does not actuate the locking member 10 during the return movement of the slide 19.

If the angle between two adjacent recesses 14 is large, the cam lobes can of course be changed by successively pushing the toothed rack 20 several times without moving the slide 19 back into the initial position between each movement.

As stated above, the embodiment described is intended as an example, and the invention is not restricted thereto. Instead of mounting the actuating member for longitudinal displacement at the side of the camera baseboard in order to rotate the cam in relation to the cam support, the cam support could, for example, be connected to a rotary spindle which is led through the baseboard and actuated from the opposite side of the baseboard to the cam support.

What I claim is:

1. A photographic camera comprising a housing, a drop bed, a hinge connecting said drop bed to said housing, a lens carrier adapted to receive any one of a plurality of lenses each of predetermined different focal length, a track located on said drop bed, said carrier being supported on said track, means for displacing said track and said carrier along said drop bed to assume various positions of focus, a movable rangefinder actuating member mounted on said housing, a first rotary cam disc provided with separate cam surfaces extending over different angular ranges of the cam disc, each of said surfaces being shaped in accordance with a respective lens of predetermined focal length, a second rotary disc mounted on the drop bed for rotation about the same axis as the said first rotary cam disc, means for rotating said second rotary disc in dependence on the displacement of said track, a cam follower member engaging a selected cam surface and acting to adjust the movable rangefinder-actuating member and thus the rangefinder in accordance with the position of the said track on the said drop bed, and means for securing said first and said second rotary discs together for conjoint rotation, said means including a locking member, a resilient member connecting said locking member to said second rotary disc, means on said first rotary cam disc for cooperation with said locking member, and means to release said locking member to permit relative rotation of said discs.

2. A photographic camera according to claim 1, in which said cooperating means on said first rotary cam disc comprise recesses adapted to receive the locking member.

3. A photographic camera according to claim 1 further comprising an actuating member mounted for longitudinal displacement parallel to the said track and relative to the said drop bed, and means for transmitting the displacement of said actuating member to one of said first and said second rotary discs for producing relative rotation therebetween.

4. A photographic camera according to claim 3, further comprising a ratchet wheel mounted for free rotation about the axis of the said rotary discs, and wherein said means for transmitting the displacement of said actuating member comprises a toothed rack engaging said ratchet wheel.

5. A photographic camera according to claim 4 further comprising means for releasing said locking member at the beginning of the longitudinal displacement of said toothed rack.

6. A photographic camera according to claim 5, wherein said resilient member is shaped as a tongue and wherein the means for releasing said locking member comprises a lever pivotally mounted on said drop bed, said lever being disposed so that one of its ends is in engagement with the said tongue, said release means further including a camming surface on the longitudinally displaceable toothed rack disposed so as to engage a part of the said lever acting as a cam follower whereby said lever is pressed towards said drop bed by a camming action when said toothed rack is longitudinally displaced, the movement of said lever in turn actuating said tongue for releasing the locking member.

7. A photographic camera according to claim 6 in which said toothed rack is pivotally mounted on said actuating member, and a spring pressing said toothed rack into engagement with said ratchet wheel.

8. A photographic camera according to claim 3 comprising manually releasable locking means for securing said longitudinally displaceable actuating member against unintentional movement.

9. A photographic camera comprising a housing, a drop bed, a hinge connecting said drop bed to said housing, a lens carrier adapted to receive any one of a plurality of lenses each of predetermined different focal length, a track located on said drop bed, said carrier being supported on said track, means for displacing said track and said carrier along said drop bed to assume various positions of focus, a movable rangefinder-actuating member mounted on said housing, a first rotary cam disc provided with separate cam surfaces extending over different angular ranges of the cam disc, each of said surfaces being shaped in accordance with a respective lens of predetermined focal length, a second rotary disc mounted on the drop bed for rotation about the same axis as the said first rotary cam disc, a ratchet wheel mounted for free rotation about the said axis, connecting means between said ratchet wheel and said first rotary cam disc, means for securing said first and said second rotary disc together for conjoint rotation, means for rotating said second rotary disc in dependence on the longitudinal displacement of the said track, and a cam follower member cooperating with the said cam surface for adjusting the rangefinder-actuating member and thus the rangefinder in accordance with the position of the said track on the said drop bed.

10. A photographic camera according to claim 9 wherein said connecting means include a pin mounted on said ratchet wheel and walls in the first rotary cam disc defining a recess and adapted to receive said pin.

11. A photographic camera comprising a housing, a drop bed, a hinge connecting said drop bed to said housing, a lens carrier adapted to receive one of a plurality of lenses each of predetermined different focal length, a track mounted on said drop bed, said carrier being supported on said track, means for displacing said track and said carrier along said drop bed to assume various positions of focus, a movable rangefinder-actuating member mounted on said housing, a first rotary cam disc provided with separate cam surfaces extending over different angular ranges of the cam disc, each of said surfaces being shaped in accordance with a respective lens of predetermined focal length, a second rotary disc mounted on the drop bed for rotation about the same axis as the said first rotary cam disc, means for rotating said second rotary disc in dependence on the displacement of said track, a cam follower member engaging a predetermined cam surface and acting to adjust the movable rangefinder-actuating member and thus the rangefinder in accordance with the position of the said track on the said drop bed, means for securing said first and said second rotary discs together for conjoint rotation, said securing means including a locking member, resilient means fastened to said second rotary disc and carrying said locking member, recess means in said first rotary cam disc for engagement by said locking member, the camera further comprising an actuating member mounted on said drop bed, means for automatically releasing said locking member at the beginning of the movement of said actuating means, and means for transmitting the movement of said actuating member to said first rotary disc for rotating said first rotary disc relative to said second rotary disc.

References Cited by the Examiner

FOREIGN PATENTS 1,053,719  9/53  France.

NORTON ANSHER, *Primary Examiner.*

JOHN M. HORAN, *Examiner.*